United States Patent
Raje

(10) Patent No.: US 7,934,149 B1
(45) Date of Patent: Apr. 26, 2011

(54) AUTOMATED CREATION AND MAINTENANCE OF PROGRAMS TO PROCESS INTERNET FORM RELATED SUBMISSIONS

(75) Inventor: Prasad Raje, Fremont, CA (US)

(73) Assignee: Instantis, Inc., Sunnyvale, CA (US)

( * ) Notice: Subject to any disclaimer, the term of this patent is extended or adjusted under 35 U.S.C. 154(b) by 266 days.

(21) Appl. No.: 09/669,594

(22) Filed: Sep. 26, 2000

Related U.S. Application Data

(60) Provisional application No. 60/157,350, filed on Sep. 30, 1999.

(51) Int. Cl.
  *G06F 17/00* (2006.01)
  *G06F 9/44* (2006.01)
(52) U.S. Cl. ......... 715/221; 715/22; 715/749; 717/106; 709/201; 709/203
(58) Field of Classification Search .......... 707/505–507, 707/513, 10, 100; 709/217, 201–203; 713/201; 345/335, 356; 717/2, 1, 106; 715/505, 513, 715/506, 507, 809, 221–226, 227, 243, 780, 715/749; 719/311
See application file for complete search history.

(56) References Cited

U.S. PATENT DOCUMENTS

| | | | | |
|---|---|---|---|---|
| 5,119,476 A * | 6/1992 | Texier | ............................ | 345/809 |
| 5,404,294 A * | 4/1995 | Karnik | ............................ | 715/507 |
| 5,557,723 A * | 9/1996 | Holt et al. | ....................... | 715/506 |
| 5,619,635 A * | 4/1997 | Millman et al. | .............. | 715/221 |
| 5,619,708 A * | 4/1997 | Ho | ................................. | 715/224 |
| 5,704,029 A * | 12/1997 | Wright, Jr. | ..................... | 707/505 |
| 5,745,712 A * | 4/1998 | Turpin et al. | ................... | 715/763 |
| 5,784,562 A * | 7/1998 | Diener | ........................... | 709/217 |
| 5,793,966 A * | 8/1998 | Amstein et al. | ............... | 709/203 |
| 5,796,952 A * | 8/1998 | Davis et al. | .................... | 709/224 |
| 5,815,149 A * | 9/1998 | Mutschler et al. | ............ | 715/762 |
| 5,819,092 A * | 10/1998 | Ferguson et al. | ................. | 717/1 |
| 5,835,712 A * | 11/1998 | DuFresne | ....................... | 709/203 |
| 5,845,299 A * | 12/1998 | Arora et al. | .................... | 707/513 |
| 5,875,332 A * | 2/1999 | Wang et al. | ........................ | 717/2 |
| 5,892,905 A * | 4/1999 | Brandt et al. | .................. | 713/201 |
| 5,895,468 A * | 4/1999 | Whitmyer, Jr. | ................. | 707/10 |
| 5,953,731 A * | 9/1999 | Glaser | ............................ | 707/513 |
| 5,956,038 A * | 9/1999 | Glaser et al. | ................... | 345/356 |
| 5,956,736 A * | 9/1999 | Hanson et al. | ................. | 715/234 |
| 6,005,597 A | 12/1999 | Barrett et al. | ..................... | 725/46 |
| 6,088,700 A * | 7/2000 | Larsen et al. | ................... | 707/10 |
| 6,167,432 A * | 12/2000 | Jiang | ............................. | 709/204 |
| 6,167,523 A * | 12/2000 | Strong | ............................ | 726/21 |
| 6,188,400 B1 * | 2/2001 | House et al. | ................... | 345/135 |

(Continued)

OTHER PUBLICATIONS

Thistlewaite, Paul et al., Active FORMs, Computer Networks & Isdn Systems, Amsterdam, 1996, vol. 28, Issue 7-10, start p. 1355.*

(Continued)

*Primary Examiner* — Adam L Basehoar
(74) *Attorney, Agent, or Firm* — Blakely, Sokoloff, Taylor & Zafman LLP

(57) ABSTRACT

According to one aspect of the present invention, a method is provided in which a form is received from an author. A parsing function is performed to extract attribute information with respect to various form elements contained in the form. A user interface is presented to the author to allow the author to configure a set of actions that are to be performed in processing the submissions of the form.

27 Claims, 6 Drawing Sheets flow diagram of one embodiment of a method for form configuration

U.S. PATENT DOCUMENTS

| | | | | |
|---|---|---|---|---|
| 6,192,380 B1* | 2/2001 | Light et al. | ............... | 715/207 |
| 6,192,405 B1* | 2/2001 | Bunnell | ............... | 709/225 |
| 6,199,079 B1* | 3/2001 | Gupta et al. | ............... | 715/207 |
| 6,212,673 B1* | 4/2001 | House et al. | ............... | 717/1 |
| 6,247,029 B1* | 6/2001 | Kelley et al. | ............... | 715/207 |
| 6,268,852 B1* | 7/2001 | Lindhorst et al. | ............... | 715/744 |
| 6,272,506 B1* | 8/2001 | Bell | ............... | 715/255 |
| 6,337,696 B1* | 1/2002 | Lindhorst et al. | ............... | 715/763 |
| 6,345,278 B1* | 2/2002 | Hitchcock et al. | ............... | 707/100 |
| 6,460,042 B1* | 10/2002 | Hitchcock et al. | ............... | 707/10 |
| 6,518,979 B1* | 2/2003 | Spertus et al. | ............... | 715/762 |
| 6,714,928 B1* | 3/2004 | Calow | ............... | 1/1 |
| 6,950,981 B2* | 9/2005 | Duffy et al. | ............... | 715/222 |
| 6,950,983 B1* | 9/2005 | Snavely | ............... | 715/206 |
| 7,010,616 B2* | 3/2006 | Carlson et al. | ............... | 709/246 |
| 7,051,273 B1* | 5/2006 | Holt et al. | ............... | 715/226 |
| 7,171,615 B2* | 1/2007 | Jensen et al. | ............... | 715/222 |
| 7,222,291 B2* | 5/2007 | Estrada et al. | ............... | 715/201 |
| 7,296,221 B1* | 11/2007 | Treibach-Heck et al. | ............... | 715/224 |
| 7,376,891 B2* | 5/2008 | Hitchock et al. | ............... | 715/221 |
| 2002/0133567 A1* | 9/2002 | Te | ............... | 709/219 |
| 2004/0205525 A1* | 10/2004 | Murren et al. | ............... | 715/505 |
| 2005/0108624 A1* | 5/2005 | Carrier | ............... | 715/505 |

OTHER PUBLICATIONS

OmniForm User's Manual, Caere Corporation,1999, pp. 1-108, 173-199.*

PR NewsWire article, Mar. 22, 1999, ProQuest Direct, pp. 1-5.*

ScanSoft OmniForm 4.0: Why should you upgrade? (May 19, 2000), 4 pages. http://web.archive.org/web/20000519211911/caere.com/products/omniform/whyupgrade.asp (Accessed Jan. 13, 2009).

ScanSoft OmniForm Internet Suite, (Aug. 15, 2000), 5 pages. http://web.archive.org/web/20000815210519/www.caere.com/products/omniform/ofis.asp (Accessed Jan. 13, 2009).

ScanSoft OmniForm 4.01 Sample Perl Scripts, (Aug. 17, 2000), 2 pages. http://web.archive.org/web/20000817082240/www.caere.com/products/omniform/perl/ (Accessed Jan. 13, 2009).

ScanSoft CGI Wizard for OmniForm 4.01, (Aug. 31, 2000), 3 pages. http://web.archive.org/web/20000831070559/www.caere.com/products/omniform/perl/cgiwizard.asp (Accessed Jan. 13, 2009).

ScanSoft OmniForm 4.0—Fact Sheet (Jun. 19, 2000), 6 pages. http://web.archive.org/web/20000619021852/www.caere.com/products/omniform/of4facts.asp (Accessed Jan. 13, 2009).

PCT International Search Report for PCT/US00/26883, mailed Jan. 30, 2001, 4 pages.

PCT Written Opinion for PCT/US00/26883, mailed Aug. 1, 2001, 7 pages.

* cited by examiner

Figure 1: Example of a simple HTML form (F) showing html code

```
<head>
</head>
<body>
<h3>This is a simple html form</h3>
<form method=POST action="http://www.remoteserver.com/form.cgi">

This is html within the form tags, but not within input
elements.<p>

Name: <input type=text name=firstname size=10><p>

Smoker?: <input type=radio name=smoker value=yes> Yes  
         <input type=radio name=smoker value=no> No<p>

Location:
<select name=location>
<option value=US>USA
<option value=ROW>Other
</select> <p>

<input type=hidden name=id value=1002>
<input type=submit name=submit value="Submit Form">

</form>
This is html material outside the form tags.
</body>
```

Figure 2: Example of simple form (F) rendered in a browser
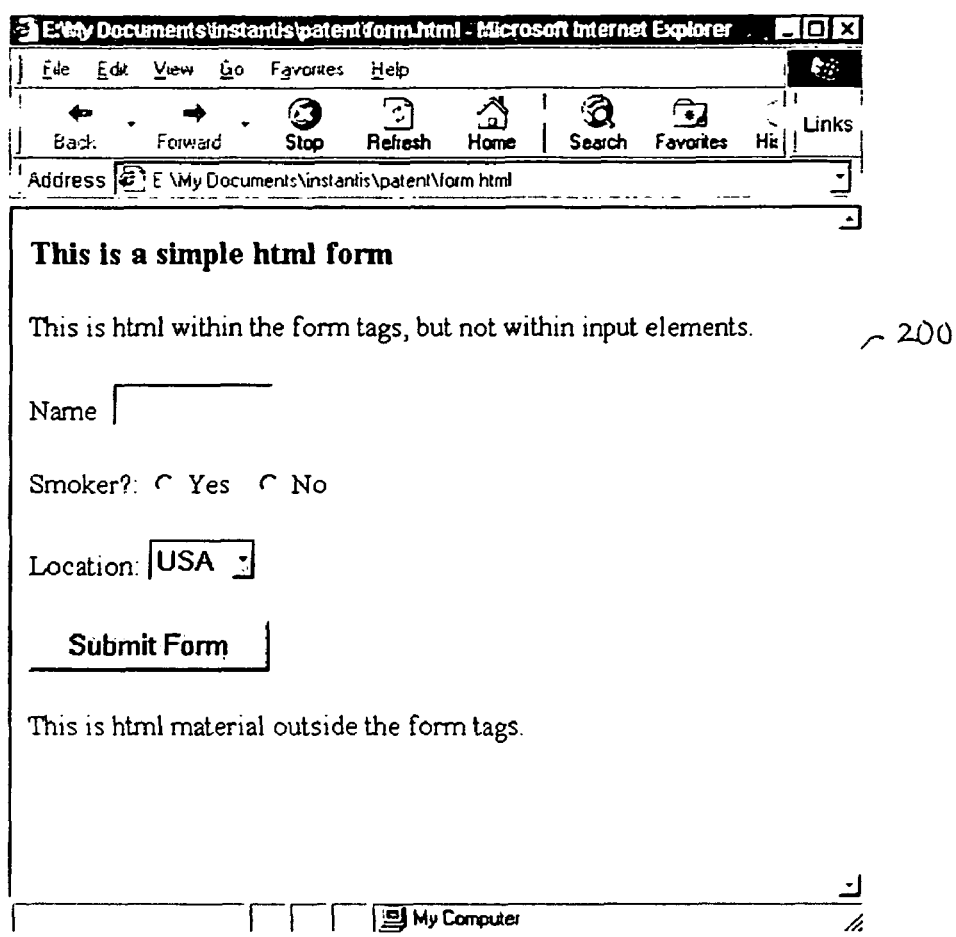

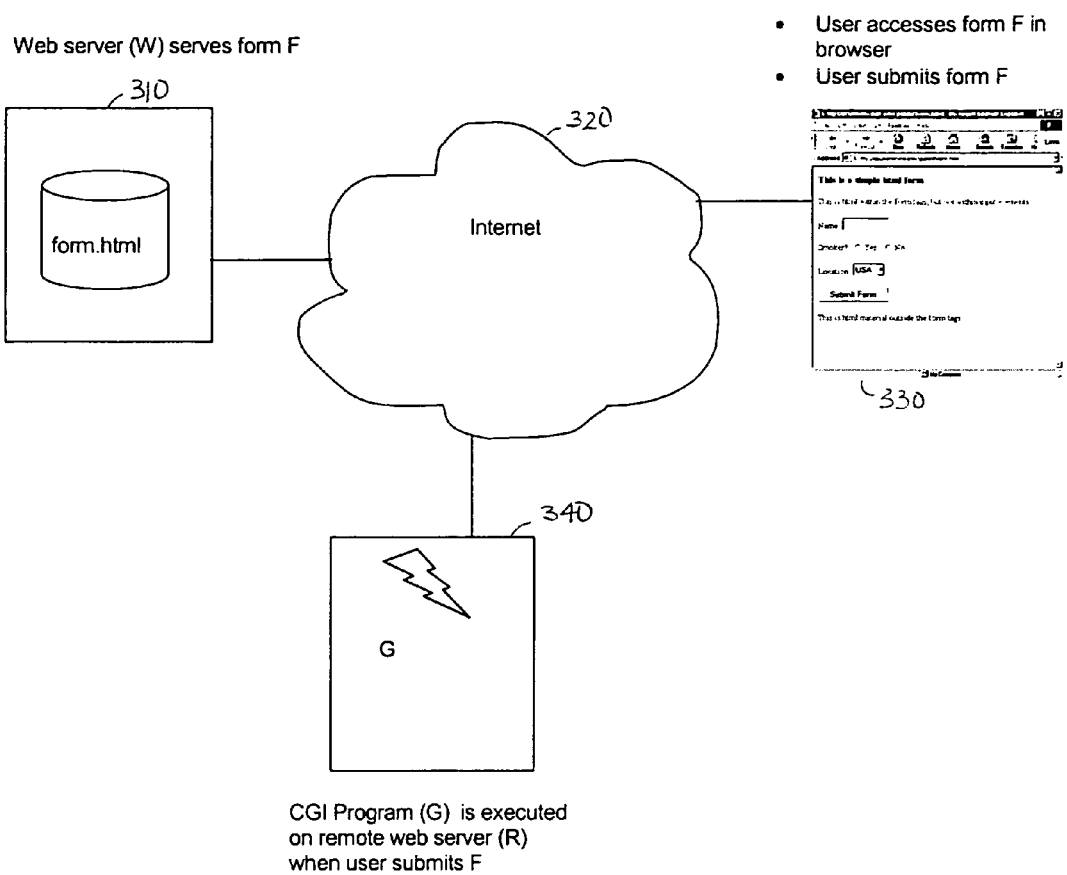
Figure 3: one embodiment of a system configuration according to the teachings of the present invention Figure 4: Example of one embodiment of a user interface for configuring form functionality

400

Configuration of form functionality

Choose these links to configure the functionality of your form

Form upload

Upload your form here: [          ] Browse...
or
Enter the URL to your form: [          ]

Validation configuration

Click here if you wish to ensure certain fields are present in the form

Response page configuration

Click here to configure what response your user sees when the form is submitted

Email configuration

Click here to configure how the form should be emailed to you

Database configuration

Click here to configure how the form input should be stored in a database

Advanced configuration

Click here for advanced configurations like cookie tracking, license key generation, derived quantity generation, special alert actions etc.

Submit Query

Figure 5: block diagram of one embodiment of a system for remote configuration of forms and generation of cgi
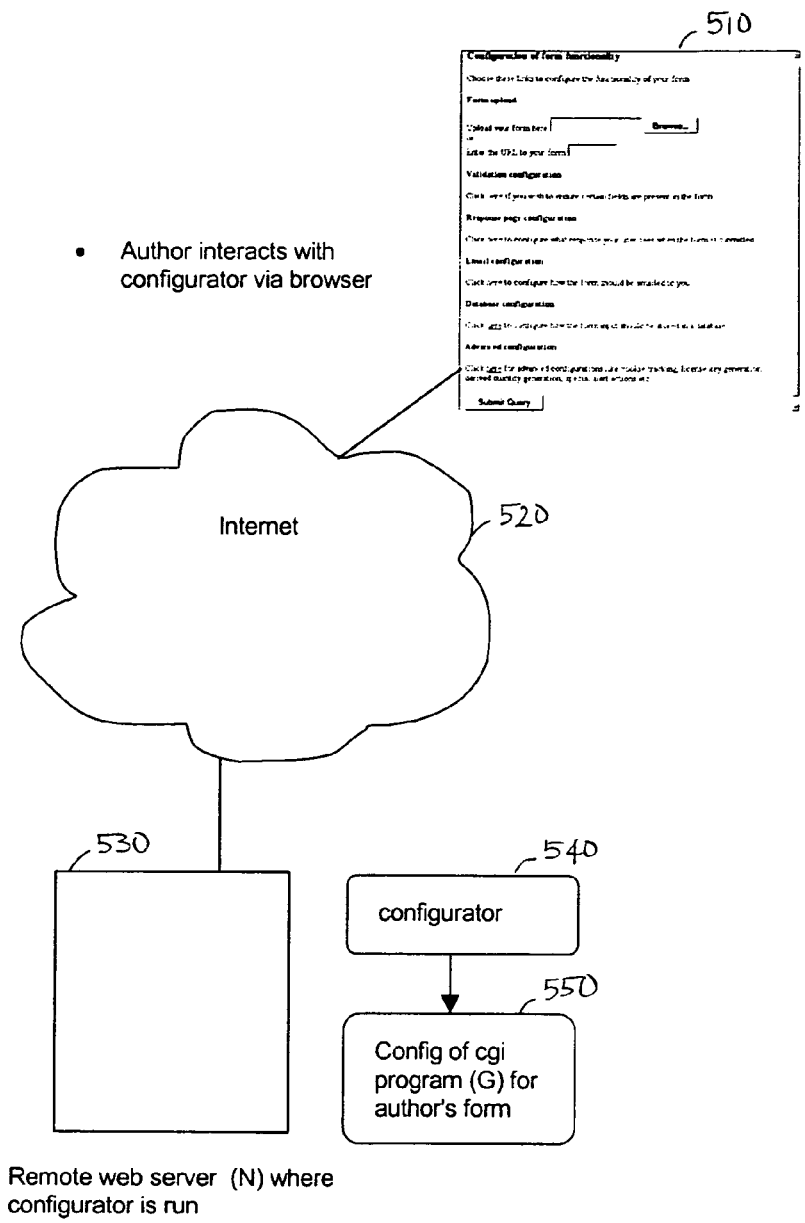

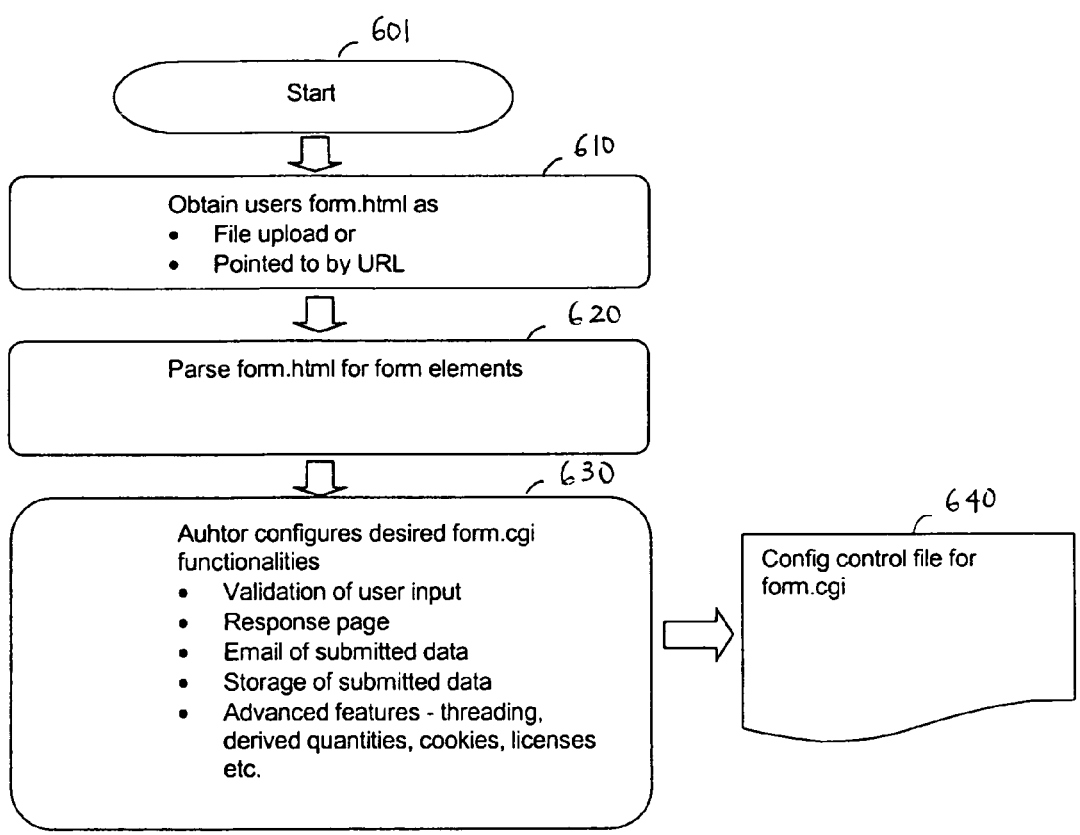
Figure 6: flow diagram of one embodiment of a method for form configuration

AUTOMATED CREATION AND MAINTENANCE OF PROGRAMS TO PROCESS INTERNET FORM RELATED SUBMISSIONS

RELATED APPLICATIONS

This application claims the benefit of U.S. Provisional Application No. 60/157,350, filed Sep. 30, 1999.

FIELD OF THE INVENTION

The present application relates generally to the field of information processing. More specifically, the present invention relates to a method, apparatus, and system for enabling the creation and/or maintenance of CGI scripts on the Internet.

BACKGROUND OF THE INVENTION

Hyper Text Markup Language (HTML) is a popular authoring language used to create documents on the World Wide Web (WWW). HTML forms are in widespread use on the Internet in order to receive input from users that visit a web site. HTML forms elements are a subset of the HTML specification. The complete specification for HTML forms is not recited here, but is incorporated by reference.

HTML forms can contain various input elements including the following:

- text fields (represented in HTML as <input type=text>)
- password fields (<input type=password>)
- radio buttons (represented as <input type=radio>)
- checkboxes (<input type=checkbox>)
- buttons like submit, reset and button (<input type=submit>, <input type=reset>, <input type=button>)
- select lists (<select> <option> </select>)
- text areas (<input type=textarea>)
- hidden fields (<input type=hidden>)
- file field (<input type=file>)

FIG. 1 shows a simple example HTML file containing a simple form with some of the elements shown above. FIG. 2 shows the same HTML form rendered in a modern browser. The input elements may have many different attributes. Usually, each of the input elements has a name that serves as a variable identifier. Collectively, the specific set of form fields in a particular form can be referred to as the "input fields" of that form. The set of names of the input fields of a particular form can be referred to as the "input field names" of that form. In the example shown in FIG. 1, the input field names are: firstname, smoker, location, id, submit.

Users provide input into these form elements on a web page. A user's input in some field in the browser effectively becomes the value associated with the name of that field when the form is submitted to a web server for processing. The specific user inputs into a specific form are referred to as the "input field values" or "submitted field values" or the "submitted form values".

When an HTML form is submitted (e.g., by the user clicking on a <input type=submit> element or by causing the same effect as the pressing of a submit button using scripting language like Javascript or others), a Uniform Resource Locator (URL) on a HTTP server is accessed. The input field values in the HTML form are passed to the server using either a "GET" or "POST" method of passing these variables. The HTTP specification and the Common Gateway Interface (CGI) specification describe the manner in which the variables are delivered to the web server and then to the program that is executed as a result. In the example in FIG. 1, the method is POST and the URL that is accessed is HTTP://www.remote-server.com/form.cgi.

The program on the server that receives the user input and performs some processing of the input and generation of a response is called a "CGI program". The term CGI program used here does not imply any particular language (which could be Java, C, shell scripts, Perl, Python, ASP, Tcl/Tk etc) or any particular server hardware or HTTP server software.

The CGI program can be located at an arbitrary location referenced by an URL as specified in the <form> tag of the HTML page. The tag contains an ACTION attribute that specifies the URL of the CGI program. Typically, the CGI program is on the same web server as the HTML form. But this is not necessary and the CGI program can reside at an arbitrary URL. A CGI program that resides on a different web server from the HTML form is referred to as a "remote" CGI program. A CGI program that resides on the same web server as the HTML form is referred to as a "local" CGI program. The CGI program or CGI script can be a fully general program that is executed when a form submission is received. In order to write any arbitrary CGI program for any arbitrary form, it would require a human that is capable of writing the program and it would require this human to have knowledge of the form field elements and knowledge of what functionality the program is intended to have. One of the aspects of this invention is to eliminate the need for a human to write the CGI program. Thus, the CGI program is to be generated programmatically. In order to make this problem tractable, the CGI program cannot be expected to perform any arbitrary function. Instead, there is a super set of actions that this CGI program might perform. This superset can include performing some computation with the input field values to generate some dependent values, generation of a web page in response to the user, generation of various email messages which can contain some or all of the input field values or other content, storage of the submitted data in a database or other persistent store, triggering of change of state of the contents of a database or persistent store etc. These actions are described in more detail later. For any given form, the CGI program might perform some subset of the superset of actions. Thus, a specification is required that is the set of actions that the CGI program is expected to perform for a given form. These actions may or may not depend on the field elements of a given form. These actions may or may not depend on the field values entered by a given user in a given form.

CGI programs may be classified into the following types on the basis of the dependence of the actions performed by the CGI program on the specifics of the form field elements or the form field values.

Type A: This is a CGI program that does not require any a priori information of any of the specific input fields in the form. It performs the same function, regardless of the specific input fields in the form. By extension, it performs the same function regardless of the specific submitted field values in the form. An example of this type of CGI program would be a CGI program that simply takes all the input field names and submitted field values and saves it into a file and provides a fixed response to the submitter. In the example shown in FIG. 1, if the CGI program was type A, it might simply respond to the user with an HTML page containing the string "Thank you". The program would respond in exactly the same way if the form was modified to include a few extra input fields, or if a completely different form had its ACTION URL pointing to this Type A CGI program.

Type B: This is a CGI program that does not require any a priori information of most of the specific input fields in the form, but does rely on the existence of certain agreed upon input field names to customize certain aspects of the behavior of the CGI program. The "agreement" is between the author of the form HTML who determines the fields and their names in the form and the author of the CGI program that expects to use certain field names to control its behavior. In the example in FIG. 1, the CGI program "form.cgi" may expect to see an input field name such as "emailto" in the form and uses the submitted field value associated with the "emailto" field to determine the email address to which to email all the submitted field values. Apart from these "agreed upon" field names, this type B CGI program makes no assumptions and has no knowledge of any of the other input fields or the input field names or the input field values. If the form html was modified to have a few new fields, but the emailto field was retained, then the type B CGI program would perform execution in exactly the same way for this new form. That is, it would send the email to the value submitted in the emailto field. Thus, a priori knowledge of all fields in the form is not required for the CGI program to perform its function. These arguments are not limited to emailing of form contents, the same arguments apply to other functions performed by CGI programs. For example displaying an html page in response to a submission etc.

Type C: This is a CGI program that does require a priori information about the specific input field names of the form and whose behavior depends on a substantial number of these input fields. However, there is no functional dependence on the submitted field values of any of the fields. In the example in FIG. 1, "form.cgi" would be a type C CGI program if it expected to store the user's input in a database table whose columns matched the fields in the form, namely firstname, smoker, location and id. The same function is performed regardless of the actual values of the submitted form fields. However, if the form was modified to have an extra field such as "Age", then the same "form.cgi" would not be able to store the user's input for "Age" in the database table because there was no column defined for "Age" in the database table. Thus, "form.cgi" requires a priori information about the fields in the HTML form.

Type D: This is a CGI program that does require a priori information about the specific input field names of the form (like a Type C program described above) and also whose functional behavior depends on the specific submitted field values input by a user during a particular submission. The CGI program needs to have knowledge of the specific field name that asks for the user's input and the user's input further determines a functional behavior of the program. In the example in FIG. 1, "form.cgi" would be a type D CGI program if it examined the value of the user's response to the radio element "smoker" and if the input was "yes"—it responded with "You are wise to not smoke" and if the input was "no"—it responded with "The Surgeon General has determined that smoking may lead to cancer".

One of the aspects of this invention is to enable the programmatic creation of CGI programs. A further aspect is to do this with minimal interdependence between the authoring of HTML form and the creation of the CGI program. The HTML form is not constrained in any way with respect to the input fields (their number of type etc) in it. The author of the HTML form does not directly create the CGI program.

At most, he is expected to provide some input to enable the programmatic creation of this CGI program. This input could contain specification of what specific subset of actions should be performed by the CGI program for the specific form instance. The input may or may not contain the html form itself since these actions may or may not depend on the input field elements of the form and may or may not depend on the input field values. Depending on the type of CGI program (A, B, C or D) the following situations may arise:

By definition, a type A CGI program performs a fixed action or set of actions with no dependence on the form field elements. Thus there is no interdependence between the authoring of the form and its associated CGI program. No specification of what action is to be performed by the CGI program needs to be provided since this action is fixed a priori. No knowledge of the specific input fields in the form is required by the CGI program since the action performed is independent of the input fields In the case of Type A CGI programs, the solution may be simple. All forms that would like to avail of the functionality provided by such a CGI program can simply point to its URL in the ACTION tag of the <form> element. Of course, if some other type A CGI program is desired which performs some other (fixed) function then this can also be achieved with no dependence on the form field elements or field values.

In the case of type B CGI programs, the solution may also be simple. The functionality of the type B CGI program is also fixed for all forms. It is the responsibility of the HTML form author to learn about how the CGI program can be customized and insert appropriate directives in the HTML form with input tags of type <hidden> or other input tags. For example, suppose a CGI program performs the function of simply sending by email the user's input provided in the form. The destination address for the email could be specified by the CGI script author as a field in the HTML form with name=emailto. Thus, in the example shown in FIG. 1, the HTML author could add in a field in the HTML form as follows:

<input          type=hidden          name=emailto value=author@company.com>

When the form is submitted by the user, the CGI program expects a name "emailto" and examines its value to determine the destination for the email. Apart from this agreed upon field, the behavior of the script would be substantially independent of the rest of the form. However, this approach cannot be the full solution because the HTML author should not be expected to learn about the CGI program's specification and to insert these specific tags in the HTML form. Also, not all CGI programs can be constrained to be type A or B.

In the case of type C or type D CGI programs, there has to be some way for the CGI script to learn about the specifics of the input field names and other relevant information in the HTML form. One method may be to have an integrated system where the form is authored and the functions of the CGI program are customized at the same time.

In this scenario, the specification of what actions the CGI program should provide (e.g., where to email the form, or which text file to put it into or how to validate the form fields, etc.) is configured during the authoring of the form. The information on the specific actions may be made available to the CGI program through a configuration file that is available to the CGI program. Another method may be to embed information as comments within the HTML form and make the HTML form file directly available to the CGI program. Thus the CGI program is able to consult the configuration information via a file. When a submission of the form comes in, the CGI program knows what specific functionality is desired from this form.

Another method employed to customize the handling of the form might be to require the author of the form to create the form within a web browser that is interacting with a program that will directly generate the configuration information required for the CGI program.

However, the above methods impose a constraint on the author. It is preferable to not constrain the author to creating the HTML form in any particular front end authoring tool or to visit a web site to create the HTML form. It is preferable to provide the flexibility to the author of the HTML form to create the HTML in any suitable environment that is capable of generating the appropriate HTML for the form, even with the CGI program of type C or type D.

SUMMARY OF THE INVENTION

According to one aspect of the present invention, a method is provided in which a form is received from an author. A parsing function is performed to extract attribute information with respect to various form elements contained in the form. A user interface is presented to the author to allow the author to configure a set of actions that are to be performed in processing the submissions of the form.

BRIEF DESCRIPTION OF THE DRAWINGS

The features and advantages of the present invention will be more fully understood by reference to the accompanying drawings, in which:

FIG. 1 illustrates an example of a simple HTML form in HTML code format;

FIG. 2 shows an example of a simple HTML form rendered in a browser;

FIG. 3 illustrates a block diagram of one embodiment of a system configuration according to the teachings of the present invention;

FIG. 4 shows an example of one embodiment of a user interface for configuring form functionality;

FIG. 5 shows a block diagram of one embodiment of a system for remote configuration of forms and generation of corresponding CGI programs; and FIG. 6 is a flow diagram of one embodiment of a method according to the teachings of the present invention.

DETAILED DESCRIPTION

In the following detailed description, for purposes of explanation and illustration, numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, and system for creating and maintaining remote CGI scripts for processing forms. In one embodiment, a form is received from an author. A parsing function is performed to extract attribute information with respect to various form elements contained in the form. The author of the form is allowed to configure a set of actions to be performed in processing instances of the form submitted by one or more users. In one embodiment, a user interface is provided to the author to allow the author to specify the set of functions to be performed in processing instances of the form. The user interface is constructed based upon the attribute information extracted from the form. In one embodiment, the user interface includes a set of questions constructed based upon the extracted information from the form. The set of questions included in the user interface is used to obtain information from the author with respect to the set of actions desired by the author in processing the form. In one embodiment, the configuration information provided by the author via the user interface is used to configure a specific program including one or more program components to perform the one or more functions specified by the author in processing the form. This specific program is designated as the program to process instances of the form submitted by the users. In one embodiment, the URL of this specific program is then provided to the form author so that it can be inserted into the ACTION attribute of the <form> tag in the author's original form html. Alternatively, the author can be provided with a "modified" form html with the ACTION tag already inserted so that the author can simply replace the original form html with the modified form html. This enables a submission to the form to delivered to the specific program that has been configured by the user to process submissions to this form. In another embodiment, a set of directives corresponding to the set of functions desired by the author is generated. This set of directives is to be used by a generic form processing program designated to process multiple forms including the first form which is authored by the first author. The generic form processing program is configured to process multiple forms based upon multiple set of directives where each set of directives corresponds to a particular form authored by a particular author. In one embodiment, a URL is provided to the author that can be inserted into the ACTION attribute of the <form>. This URL points to the generic form processing program, but in addition has an identifier that uniquely identifies this form and the set of directives that have been configured by the author. This enables a submission to the form to be delivered to the generic form processing program, which can then examine the unique identifier and execute the specific set of functions configured by the author.

In one embodiment, a configuration data structure is generated based upon the configuration information provided by the first author using the first user interface. In one embodiment, the consistency between the configuration data structure and the first form is maintained. In one embodiment, the configuration information contained in the configuration data structure is modified accordingly in response to changes in the specification of the first form. In one embodiment, it is determined whether the first form has been changed since the configuration data structure corresponding to the first form was created. If the first form has been changed since the configuration data structure was created, the configuration data structured is updated to reflect the changes that have been made to the first form. In one embodiment, the configuration data structure is modified based upon the changes to the first form that are provided by the author. In another embodiment, a timestamp associated with the first form is maintained to determine whether the form has been changed. The timestamp associated with the first form is periodically checked to determine whether the first form has changed. If so, indicate that the first form and the configuration data structure are out of sync. In another embodiment, it is determined whether the form has been modified with respect to the form elements contained in the form. If so, indicate that the form and the configuration structure are out of sync. In yet another embodiment, maintaining consistency between the form and the configuration structure is performed at the time when an instance of the form submitted for processing. In this scenario, the current instance of the form elements in the form are extracted and compared with previous instance of the respective form elements stored in the configuration structure. If the current instance and the previous instance of the form elements are different, indicate that the form and the configuration structure are no longer consistent.

FIG. 3 illustrates a system configuration according to the teachings of the present invention. As shown in FIG. 3, in this configuration, it is assumed that a form F is authored by an author A using any HTML authoring environment on some computer C. In one embodiment, there should be no constraints imposed on the number, nature, names of the fields or surrounding HTML text and tags in F. It is also assumed that the form F is to be served on the web by a web server W (W may be the same as C). In one embodiment, F may be referenced by its corresponding URL (e.g., HTTP://W/F). It is further assumed that the CGI program G for this form is "remote", that is, it is on a distinct web server R. As a degenerate case, it is possible for R to be the same as W, but it is not a necessity. In one embodiment, the location of the CGI program G may be referenced by its corresponding address in URL format. Accordingly, the target URL for the ACTION attribute in the <form> tag of the form F may be specified as HTTP://R/G. Thus a user U that accesses F, fills it out, and submits it, will cause the URL HTTP://R/G to be accessed and cause the CGI program G to be executed. It is assumed that the author A has no ability or desire to write the specific program code inside CGI program G. Therefore, it is assumed that the CGI program G needs to be generated programmatically, without human action, on a computer distinct from C. It is also assumed that during the authoring of form F, there is no information about F made available to the program that generates the CGI program G. Further, G is not constrained to be necessarily a Type A or a Type B CGI program. That is, G does not necessarily have a fixed behavior regardless of the details of form F (i.e., it is not necessarily a type A) and there are no agreed upon fields to be placed in the form F (i.e., it is not type B). G may be a Type C or Type D CGI program, one whose functionality depends on the field names in F and possibly on the submitted field values. It is further assumed that there is no restriction on author A with respect to changing any part of form F at any time.

In the discussion below, the teachings of the present invention are utilized to provide a solution to the problem described above.

FIG. 4 illustrates a block diagram of one embodiment of a system configuration to allow an author A of a form F to configure a remote CGI program G that will be used to process instances of the form F. As shown in FIG. 4, the author A may use a web browser to open a web page on a computer N. N is distinct from C, but could be the same as R. The author A then provides to N the URL of F (e.g., HTTP://W/F). Alternatively the author A might upload form F to N directly.

In one embodiment, a parser program P on N fetches F and performs the function of parsing F. The parsing function includes extracting information from the input field tags in F. This information may include a list of the fields, the field types, the field names, values of other attributes of each field etc. In one embodiment, the parsing function also includes creating a "signature" of all the text within the tags of the HTML form that correspond to user inputtable fields. In one embodiment, this signature of form F is stored along with other information about F including file modification date, if available.

Continuing with the present discussion, in one embodiment, a configuration program U takes the output of parser P, and dependent on the fields in F, presents to the author A, a user interface through the web browser. The user interface may be a Java applet or an HTML page with form fields for the purposes of customization. An example of one embodiment of the user interface is illustrated in FIG. 5. In one embodiment, the user interface as shown in FIG. 5 is used by the author A to configure a set of functionalities or functions that are desired by the author A to be included in the CGI program G. In this example, it is assumed that the CGI program G is the processing program for form F. An illustrative set of various functionalities that may be configured according to the teachings of the present invention is described in more details below. The knowledge of the form as represented in the output of parser P is used by configuration program U to ask only relevant questions that are presented to A in the user interface. For example, if G is required to do validation of submitted field values, then U knows to ask for string validation for fields in form F that are of type text <input type=text>. Likewise, if there is a field with name matching "email" then U can make intelligent guesses and ask A if the field should be checked to contain an email address, etc. In addition, U also presents to the author A, various questions relating to various functions that are to be performed in G, including, but not limited to, emailing the submitted form fields, saving the submitted form fields in text files/directories or databases, generating cookies, performing computations on the input fields of F, taking special actions based on submitted field values etc. As such, the author A is provided with the capability to configure the various functionalities for the CGI program G with respect to the processing of form F from a browser based environment. In one embodiment, the configuration program U may include several separate programs, subprograms, or program components, each of which is designed to configure one or more functions that are to be included in the CGI program G.

In one embodiment, the output O generated by the configuration program U may be a CGI program that may include various code modules (also referred to herein as program components). In one embodiment, each code module may be configured to correspond to a functionality area or function to be performed in processing form F (e.g., response to user, emailing the form etc.). The module may be further customized based on the specific configurations performed by the author A. In this scenario, there is a separate program G for each separate form F and set of configurations for F. Alternatively, in another embodiment, the output of the configuration program U may be a set of configuration directives for a general purpose CGI program. In this embodiment, G can be configured to be the same processing program for all forms F. However, the path of execution through G is different for each form F and its configuration settings. Thus, the course of execution through G for each form F and its configuration is controlled by the corresponding set of configuration directives generated by the configuration program U. For example, if an author A1 configuring form F1 did not want to perform any validation of the form inputs, the validation module would not be executed because of the appropriate switch statement (or other similar mechanism). Likewise, another author A2 configuring form F2 who did not want any emailing of the form would result in the configuration directive containing a setting that would prevent the execution of any code in G relating to emailing of the form. Another author A3 configuring F3, with a finer degree of configuration within the form emailing feature relating to the format of the email would end up invoking appropriate sections of code within G for controlling the format of the email, etc. When the form is submitted and G is executed, additional information needs to be provided to G such that it can access the specific configuration for the form being submitted. This might be done with an extension to the URL of G. For example the ACTION attribute in the <form> tag would be http://R/G/F1 when form F1 is submitted or http://R/G/F2 when form F2 is submitted. This will cause G to be executed, but per the CGI spec, G will have additional information indicating that the extension F1 was present or the extension F2 was present, allowing it to look up the appropriate configuration directives for F1 or F2. This could also be achieved by other means like providing a <input type=hidden> element in the form. For example <input type=hidden name=formid value=F1> in form F1, and <input type=hidden name=formid value=F2> in form F2. Thus when F1 is submitted, it will come with a formid=F1 and G will be able to access the configuration directives for F1 and execute the actions that the author configured for F1.

As such, these configuration directives are specific to each form F. The advantage of this approach is that there is only one CGI program G to maintain and develop. Execution efficiencies are also possible because only one copy of the program needs to be in memory even if there is a large number of simultaneous submissions of many different forms.

In one embodiment, the output O of U represents the set of functionalities or functions desired by author A in the corresponding CGI program G that is designated for the processing of form F's submissions by the users. In one embodiment, the output of U may be represented as a configuration file or configuration data structure. In one embodiment, it is possible for the author A to be taught about the syntax of the configuration file that is the output of U. Then the author A might provide the configuration information directly, without the help of a user interface. The configuration information may be provided by the author A in the form of a simple text file that contains directives that are used for configuring the actions or functions of G. In one embodiment, the configuration program U might also provide for the configuration of other items beyond the configuration of G. For example, it might provide for the configuration of how the cumulated form submissions are to be managed which is not related to the actions that take place in G during the actual submission of the form. Once the author has configured the desired functionalities of the CGI program G, the original form of the author needs to be set up such that submissions to the form do indeed invoke G. This can be done by simply ensuring that the ACTION attribute of the <form> tag in the form F points to the appropriate URL. This is http://R/G with possibly extra identifiers in the URL as described above. The author may choose to simply edit the form to insert this URL or the author may be provided with a "modified" form which contains the appropriate URL already inserted into the ACTION attribute of the form or other appropriate insertion of an identifier into the form html. This would enable the author to simply replace the original form F, with a substantially identical form that is set up to invoke the remote CGI program G upon submission.

The present invention described herein also provides a solution to the problem of change management with respect to the form F described above. The CGI program G that is created after the configuration might be a Type A/B or a Type C/D program. If it is a type C/D program, then any changes made by author A to the form F could have a potential impact on the correct functioning of G.

The problem associated with the change management of form F is illustrated with the following example. In the example form in FIG. 1, suppose the CGI program is expected to respond with a set of instructions which depend on the user's location as selected in the "Location" select input. Suppose the form author changes the form such that an additional location is added, e.g., to change the HTML in the select input to Location:

<select name=location>
<option value=US> USA
<option value=Asia> Asia
<option value=ROW> Other
</select> <p>

Then the corresponding CGI program designated to process form F will not be able to correctly provide the needed response for the Asia location. Thus a change in the form can lead to incorrect operation of the CGI script if it is kept unchanged.

According to the teachings of the present invention, several levels of solution may be implemented to solve this problem. These solutions include:

1. Asking the author A of F to communicate to the configurator (i.e., the configuration program U) that F has changed and going through some part of the configuration process again to make the appropriate changes to the CGI G. One disadvantage with this approach is that it may be error prone if the author A forgets to do this.

2. Keeping track of the time stamp of the form F. When the CGI program G is first configured for F, the timestamp and file size of F is stored. In one embodiment, a periodic process called a "consistency checker" CCP1 running on the remote web server R or on a related computer, could periodically check the timestamp of F to see if it has changed compared to the stored value. One method of checking the timestamp of F is to use the HTTP protocol to check the "Last-Modified" date of the form html. In one embodiment, if a change is found, then this would set a "out of sync flag" (OF1) that would indicate that F is out of sync with G. When the OF1 is set, unpredictable results can occur if a submission is received by G. The execution could proceed properly or there might be too many changes in F for G to handle. In general, this would be difficult to ascertain a priori. Thus one action for CCP1 to take could be to send an email or other notification to the form author indicating that the form and its configuration were out of sync. One action that the author could take then would be to redo the configuration with the changed form.

A limitation with the approach described above in solution #2 is that changes to the form F would trigger the out of sync flag even when there is no need for a change in G. For instance, in the example HTML form of FIG. 1, if the author A simply edited a spelling mistake in the HTML outside the <form> tags, or if the author added in some explanatory text like "Please select a Location" instead of just the word "Location:", then there would be a change to the timestamp and/or file size of F. This would trigger the "out of sync flag". However, the functional behavior of G is really not changed because of this change in the form.

3. An improvement over solution #2 would be to set the "out of sync flag" with a finer granularity of change. One method would be for the consistency checker actually fetching F using its URL http://W/F. Then the internals of the html in F can be examined for changes. In particular, the change in F that might be relevant to G can be considered to be limited to changes within the input field elements of the form. These changes include:

Addition of a new field element. In the example of FIG. 1, this might be the inclusion of a new text field such as:

Last Name: <input type=text name=lastname size=10>
<p>

Removal of an existing field element. In the example of FIG. 1, this might be the removal of the text input for firstname.

Change to an existing field element. This covers any change to an existing input element, in its name, its possible values for those elements which have a finite set of possible values (elements like radios, checkboxes, selects etc.), its visual representation like size or other attributes of the input element. In the example of FIG. 1, inclusion of an additional response for the Smoker question is a change to an existing field element.

Smoker?: <input type=radio name=smoker value=yes> Yes   <input type=radio name=smoker value=no> No   <input type=radio name=smoker value=former> Former smoker<p>

Thus the consistency checker CCP1 would be enhanced to check the form F not just for timestamp or file size changes, but finer granularity changes that could potentially affect the operation of G. This finer granularity checker is referred to here as CCP2. When CCP2 detects a change in F, it sets a out of sync flag OF2. When OF2 is set, G could continue to service submissions to the changed F under certain circumstances. For example, with any new field element, G could perform certain actions like including that element in an email that is sent or create an extension to the database that is to store the elements. It would however not be able to perform certain other actions like doing validation checks on this new field element. With removal of a field element, G would not be able to include that element in an email or insert it into the database, but could otherwise continue to perform its actions as initially configured. With change to an existing field element, G could also continue to perform certain actions like emailing the values or inserting them into the database. There might be certain actions that fail however—for instance if there was a validation check that was set up to ensure that a certain element had only a subset of a fixed set of values, then this validation check would fail. If a change to F were to result in an incompatible change to G, CCP2 could take the action of sending an email or other notification to the user. The user could then redo the configuration for the changed F.

4. The solution #3 described above achieves finer granularity checking but requires a continuous, periodic program CCP1 or CCP2 to check the form F. This could be expensive in terms of computational power and bandwidth, especially if a large number of forms F need to be checked. Also, if the form F is changed and submitted to G in the interval between periodic runs of the checker CCP1 or CCP2, then a problem could result from G being out of sync with F for an interim time period. Conversely, if F does not change very often, then the consistency checker CCP1 or CCP2 would be run without much benefit most of the time.

Another solution to the consistency problem is to perform the consistency checking dynamically—that is when the form is actually submitted to G for processing. This approach works as follows. In one embodiment, when the form is submitted to G, the input fields in the form are made available to G as per the HTTP and CGI Specifications. G then invokes a modified consistency checker CCP3. In one embodiment, CCP3 is similar to CCP2 in that it is concerned with a finer granularity of changes in the form F (i.e., changes in the HTML within the input fields). In one embodiment, instead of taking a complete HTML file as input, CCP3 takes as input the actual fields that are received in the user submission, per the HTTP and CGI specifications. In this manner, CCP3 is not dependent on any changes in the form F that lie outside of the input fields since these changes will not manifest themselves in the data that is submitted to G by the browser per the HTTP and CGI specifications.

During the parsing process (described above for parser P), the list of input fields in the form F and the set of allowed values for these fields are stored. CCP3 then examines the input field names and the values received when form F is submitted and compares them to the list of input field names and values that have been previously stored. If a change is detected in the input field names, the CCP3 sets the "out of sync flag" OF3. The changes that CCP3 might detect include:

Addition of a new field element. In the example of FIG. 1, the inclusion of a new text field like Last Name: <input type=text name=lastname size=10> <p> will result in the G receiving an additional field "lastname" along with the other fields received from the user's browser. This is detected by CCP3 as not being present in its prior list of known field names for the form.

Removal of an existing field element. In the example of FIG. 1, this might be the removal of the text input for firstname. In this scenario, the field firstname will not appear as one of the fields received from the user's browser. CCP3 can flag the fact that an element is absent from the form. It is possible that this absence from the form could cause an error in G, for example if G depends on the firstname field to check for duplicate submissions. However, it is also possible that, the functionality of G can proceed without causing any error, for example if G is simply storing the data in a database table, the table might be allowed to have empty fields in certain columns.

Change to an existing field element. This covers any change to an existing input element, in its name, its possible values, its visual representation like size or any other attributes of the input element. In the example of FIG. 1, inclusion of an additional response for the Smoker question is a change to an existing field element. This would be represented in the form HTML as Smoker?: <input type=radio name=smoker value=yes> Yes   <input type=radio name=smoker value=no> No   <input type=radio name=smoker value=former> Former smoker<p>

In one embodiment, if the user does not choose the new value=former when submitting the form in the browser, then the checker module CCP3 will not be able to detect any change to the form. This is acceptable since there is no change to any input to the CGI program G. If the user does choose the new value=former choice in the radio button during submission, then CCP3 will see, for the name smoker value, a new value "former" that is not in its prior stored list of values associated with "smoker". This will cause CCP3 to raise the "out of sync" OF3 flag. It is possible that the execution of G can still proceed without error even with the new value of field smoker. If is also possible that there would be an error in some part of the execution of G. In this case, CCP3 might notify the author of the form by email or other means. The author might then take the steps of going through the configuration of the actions again to ensure that the out of sync condition is removed.

The following contains a description of various types of functionality or features that the CGI program G can be configured to perform upon receipt of a submission of a form from a user. These various functionalities may be called the "submit-time" functionalities.

As described above, specification and details of each functionality can be configured by the author through a web based interface as shown in FIG. 5. Not all features will be relevant to each form. Any author may choose to use any of these features as desired.

The following list is an illustrative list of the various types of functionalities that CGI program G can be configured to provide and the types of configuration parameters that the configuration program U needs to obtain from the author of the form.

Form field validation: when a user submits a form, each field in the form can be validated against a rich set of tests. For example, a phone number field may be checked to ensure only digit or allowed separator characters, have a particular length etc. Another check might be to ensure that text fields do not have "random input" in them like "asdf" or "xxx" etc.

Derived quantity generation: based on the user input, a derived quantity may be computed or constructed. For example, if two items are selected, their total quantity can be computed.

License generation: a random license key can be generated in response to a user form.

Cookie generation and tracking: a cookie can be created and set for the user. Any existing cookies already set can be included in the forms handling by looking up the cookie in a stored database or file.

Form emailing: each form as submitted can be emailed to the customer with user filled contents in a variety of formats. The form might be emailed to fixed destination(s) or to selectable destinations, based on user input. Example, if a user expresses interest in product A (instead of product B) and the sales person handling product A is different from that handling product B, the email destination for the form would be sales person A and not B.

Email to user: in response to a form submission, an email message can be sent to the user. For example, if a user signs up to receive a newsletter, the response can provide instructions on how to unsubscribe from it. This email can further be dependent on some input in the form.

Form response: in response to a form submission, a next page is displayed. This can be customized to the customer form and to the users input. For example, the response page can contain some reference to the user's name or to something the user ordered by providing an input in the form.

Form threading: many forms are multi-part forms and state needs to be preserved between forms. Threading can be set up to ensure certain form state is passed between forms. For example, some resume submission forms might require a prequalification form to ensure the user has some basic qualifications. The subsequent application form could carry forward this information from the previous form so it does not have to be rewritten by the user.

Form logging: each form can be accumulated in a log along with other submissions of the same form by other users. Multiple log formats are supported, including single files per submission, cumulated files with each submission appended, file and directory structures created based on calendar and time, etc.

Special events: when a form is submitted that meets certain special criteria, or certain criteria are met for cumulated submissions, a special action or alert can be set up. For example, if the user has a title of CEO and the company size is >500M, then the form can be set up to be emailed directly to the VP of Sales.

The above list of functions is meant to be illustrative and other functions that CGI programs are expected to perform can similarly be included.

In one embodiment, there is a customer log in script (e.g., "login.CGI") that is used to admit a customer to the administration interface for his forms. In one embodiment, the login.CGI may output a page that contains the dynamically generated list of this user's active forms. From here, the user can select one of the forms or choose to activate a new form.

In one embodiment, this runs a form configurator program or form configurator script (for example, named "formconfigurator.CGI"). In one embodiment, the formconfigurator.CGI presents the full list of the customizable functionality for this form (validation, emailing, logging etc). From here, the customer can choose to customize each of these functionalities described herein.

In one embodiment, there is a form parser script (for example, named "parser.CGI") that parses the customer form and creates a representation of the input fields of the form. The representation could be some textual format or perhaps some language specific (e.g., Perl or Java) data structures that can be included by other scripts. In one embodiment, the parser.CGI also creates a database table for this form, with table columns being form input fields. The table might also contain spare columns for later use. In one embodiment, the teachings of the present invention can be utilized to provide for customization by advanced users that do not require going through the interactive browser interface. This might include exposing the structure and syntax of an intermediate configuration file that can be written to directly.

Form Field Validation

The form can be designed to ensure proper user input into the fields, including required fields, simple validation of field contents etc.

Each field in the form can be validated against a rich set of checks. In one embodiment, the standard input types in HTML forms are supported.

Text fields: a text field can be forced to be:
  Non empty, having a particular range of lengths
  Beginning with, ending with or containing a fixed string. For advanced users, a full regular expression check can be done.
  Containing a well formed item like: email address, telephone number, zip code, credit card number, name of US state, name of country, etc.
  Not containing "keyboard noise" like aaaa or asdf or fggh etc.

Password: a password field can be forced to have a particular length range, have a certain number of non-alphanumeric characters, not be equal or similar to another text field etc.

Checkboxes: a checkbox is usually an optional item but it can be forced to be checked. More advanced functions might include requiring the checkbox if some other precedent condition is met.

Radio buttons: a selection of one item of a group of radio buttons can be enforced.

Select boxes: the user can be forced to select any item except the default item.

File: The file can be forced to be non-null, have a certain extension, contain a string within the name, etc.

Text area: the text area can be forced to have a certain string or regular expression, have a range of length, etc.

Hidden fields: a form can have any number of hidden fields. Often hidden fields have special meaning to the forms functionality. As a security measure these fields can be forced to have fixed values or match regular expressions.

In one embodiment, each field that is validated can be named (the default is the name of the form field) and a custom error string for this field can be entered by the customer (a default can be provided). This is the string that is used when an error message is returned to the user who is filling in the form.

In one embodiment, field validation is performed each time on all elements of the form, not on each element sequentially, so that error information for the entire form can be provided at one time.

In one embodiment, the error returned to a user when a form field validation fails can be of the following types:

- A fixed HTML page is returned, indicating that the form was not complete and suggesting that the user go back to the previous page. A standard default "Incomplete Form" page is provided, but this may not match the look of the original form on the customer site. This page may be best designed by the customer or author.
- A fixed HTML page but with specific information about the outcome of the validation checks inserted into a predetermined spot is returned.
- Some type of window pop up may be implemented which would keep the original form in the browser, but provide the validation results in a second, smaller, minimally embellished, browser window.

In one embodiment, the entire set of customization for validation of the form can be named and saved in a file that may be referred to as a "validation file". Thus a user might set up various different validation requirements for a single form. This allows a whole different set of validation settings to be applied by simply naming a different validation file.

If an email address is required in the form, this can be enforced. Further, the address can be checked heuristically to ensure it appears to be an email address.

In one embodiment, the validation interface presents each input field in the form in sequence and depending on the field type presents the set of options for validation for each field. In one embodiment, each field can be named, its error string can be customized, etc, through a web form interface.

The customer may also set up the "Form Incomplete" error handling preferences. In addition, the customer may also set up the "Confirmation page". This is the page that is presented if the form submission is considered validated and proceeds without errors. The customer may also set up an "Error" page for an error situation.

In one embodiment, if validation is to be customized, a script named for example "customizevalidation.CGI" is run to provide the author with a mechanism to customize field validation. In one embodiment, there is a script that creates the validation form (named for example "validationformmaker.CGI") for the customer form, based on the output of the parser.CGI program and its internal knowledge of the types of constraints possible for the different field types.

In one embodiment, customizevalidation.CGI first runs parser.CGI and then runs validationformmaker.CGI. In one embodiment, there is a script that may be referred to as "validationfilemaker.CGI" that accepts the customer's settings for validation and generates a persistent file. In one embodiment, this file contains validation directives specific to the customer form and validation requirements. Multiple different validation files can be maintained for a single form. In one embodiment, the validation file that is currently applied may be referred to as a "current validation file". The format of the validation directives could be a formatted text file, possibly XML, or it could be language specific code (Java, Perl etc), or a mixture thereof.

In one embodiment, the CGI script that is run when a user submits a form calls, among other things that are described below, a validator script (e.g., "validator.CGI") that validates the user input versus the directives in the current validation file.

Derived Quantity Generation

The user input in a form can be manipulated and combined to create "derived quantities". These derived quantities can be used as if they were user input for the rest of the form functionality. Below are illustrative examples of the types of derived quantities:

Arithmetic quantities: any mathematical formula can be applied to a form input. For example, the total amount in an order form can be computed as the sum of the cost per item, which can be number of units times the rate per unit.

String quantities: any number of user inputs can be put together using string functions to create larger strings. For example, Full name from First Name and Last Name fields.

Array quantities: a user inputs (e.g., in a select field) can be an array subscript in a simple array or a key in an associative array. The resulting value in the array is the derived quantity.

Random quantities: a random quantity can be generated. This can be used to provide for state continuity which is also described with respect to the form threading functionality.

In one embodiment, each derived quantity may be given a name such as a variable name. Some of the examples with respect to the derived quantity functionality are provided below.

First Name and Last Name text boxes can be concatenated together into "Name".

The sum total of charges for multiple items purchased can be computed, the total with tax/shipping and handling can be computed. This can then be displayed in the response to the user.

A select box might return values of 0, 1, 2. These values could be indexed into an array that associates 0 with "Disagree", 1 with "Agree" and 2 with "Don't know". This functionality can also be used to select an element of a predetermined array at random. For example, if there is a fixed set of passwords, one of them can be handed out at random to a user.

License Generation

Many situations require a license or a key to be generated in response to a form. This can be used as a password or code or unlock key for a download, etc. The description below is an illustrative list of the functionality variants:

Certain constraints may be set before a license can be generated. These are generally the validation constraints discussed above.

The license may be a random string, numeral or other quantity like a public/private key pair.

The license may be selected (e.g., randomly/sequentially, etc) as one of a set of pre-made license keys.

The license length can be specified

The license may have some form of date encoded, eg., 052999.1132

The license, once generated, may be stored as a cookie with the user

The license may be stored along with the rest of the form data in a form log

The license may be stored in a separate log

The license may be emailed to the user who submitted the form

The license may be displayed to the user in the response page

As an example of this functionality, a software company distributes software on the net which is downloadable from the site. However, this software company requires a license key to be enabled. In this instance, the license key is provided to the user by email after the necessary fields in the form have been obtained. In one embodiment, the list of keys is taken from a table of keys uploaded to the system by the software company.

Cookie Generation

This functionality enables the customer to create cookies for each user that has submitted a form. Prior cookie values that have been set can be picked up from the user. The functionality variants are as follows:

The cookie string can be customized including its length, content, fixed parts, variable parts, random parts, etc.

The cookie parameters can be customized including the URL, the expiration, etc.

The cookie can be stored in the form logs

As an example, an online store that wants to ensure that repeat customers are offered some special items can check the cookie value set for each user submission and provide special responses to that user.

Form Emailing

When a (optionally validated) form is submitted, the form contents can be emailed to an address or a list of addresses specified by the customer.

The list below is an illustrative list of the ways in which the email contents and formatting can be controlled.

The subject line of the email can be customized

The subject might have a fixed text string

It might have a variable string composed from the name of the form, the time stamp, the submitter IP address/hostname, etc.

The content of the body might be empty. If non empty, it might be a MIME attachment or it might be in line plain text. The MIME attachment or text might be formatted as HTML or plain text or other.

The format of the content can be customized as follows:

Each field in the form can be optionally included or excluded from the email. The default would be to include every field.

Additional information not directly entered by the user can be included in the email. This might be time stamp, IP address/hostname, browser version info etc.

There could be a fixed header string and footer string above and below the list of name, value pairs submitted by the user.

The sequence of name, value pairs can be adjusted to be in "form order" or "random order" or "alphabetically sorted by field name".

Each name, value pair appearance can be customized to include/exclude the field name, to separate the name and value by a string, to stylize the field name by making it bold, etc.

The email destination can be customized. There can be a fixed destination(s) or variable destinations. The destination could depend on the user input in some form field (eg., if a user is submitting a tech support form asking about product Z, the form is emailed to tech support representative Joe who is an expert in Z).

The email delivery can be controlled to be instantaneous or delayed to a later time.

This functionality is expected to be a very widespread functionality of the hosted forms. For example, sales leads from customer inquiries can be sent to a sales email address in the company. Tech support inquiries from online forms can be sent to the tech support alias. A sales inquiry can be farmed out to separate email addresses, depending on the territory derived from the user's address. A tech support form can be sent to a specific person with the requisite skill set based on the product selection.

Email to User

After a form is received from a user, the user can be sent an email message. Below is an illustrative list of the variants of this functionality:

The email format can be inline plain text or 1 or more MIME attachments. For example, a public relations firm might have an entire press kit consisting of many files sent in response to an inquiry.

The emailed file(s) can be the same for all users, or different files may be selected depending on user input in the form. For example, if a user asks a telephone company for a calling plan information, he will get the relevant file depending on the state in the address.

The email content could be fixed or customized to the user "mail-merge" style. For example, an email to a Mr. Smith who requested a bank statement for January 99 would start with "Dear Mr. Smith, Your request for a bank statement for January 99 is now being processed." If a Mr. Jones requested a statement for February 99, his email would be appropriately customized. The merging can be done with any of the user submitted variables in the form.

As an example, a user fills in an application for a job posting on the web site. A courtesy email indicating that the form is being forwarded to the right department manager can be sent to the user. As another example, a free home pages site receives an application from a new user. In this case, an email containing detailed instructions can be sent to the new user, along with a login name and password.

Form Response

In one embodiment, the form response is an HTML page that is generated in response to a form submission. This is not the response to a user when the form fails a validation check as described above. This is generally a response to acknowledge or confirm the user's submission of the form (e.g., "Thanks for filling the form" response).

Below is an illustrative list of the variants of this functionality:

The response may be a fixed HTML page regardless of user input. This is the simplest case.

The response may be one of N static HTML pages that is selected based on some user input. For example, if a user submits a complaint form, then depending on the severity of the complaint the response HTML might be "You will be contacted to resolve the situation within 1 hour" or might be "You will be contacted in 3 days".

The response may be "mail-merge" style HTML that is customized for the user submitting the form. For example, "Mr. A, Thank you for your application to the B Council" might be a customized response. The customization variables are given values based on user input in the form and derived values in the script.

Form Threading

Many forms are designed to be used as one of a sequence. For example, a user might be asked some qualifying questions and then be presented with a follow on form. Some or all the input from the previous form can be retained in the second form as hidden fields. The hidden fields can be inserted into the response page, just below a form tag.

For example, a user fills in his contact information and some skills information at a jobs site. Based on the skills, the user may be presented with a form to submit a resume or view some specifics of job descriptions. The resume form need not ask for contact information again if the input from the first form is already available to the second form. Below is an illustrative list of the variants of the functionality:

- Any user input or hidden fields from a prior form can be chosen to be threaded over to the response for this form.
- A derived quantity can be threaded over. For example, the sum total of an order can be carried into a second form that asks for payment information
- A random number derived quantity can be threaded over. For example, state can be maintained between multi part forms by carrying the random number first generated through the sequence of forms.
- A license key can be threaded over.

Form Logging

One of the important functionalities provided is the comprehensive logging of the user submitted data. The purpose is to archive the forms contents for future reference, analysis, export etc.

Below is an illustrative list of the variants of the functionality:

- The form log format can be specified to be a file as follows:
    - The destination of each submission may be the same file. The log name is customizable. Within this file the submissions may be cumulated as follows:
        - A single submission is a row of comma separated values, with or without field names
        - A single submission may be in many lines, each submission is separated by a separator line. Each line is one field, with or without field names. Separators between records can be customized.
    - Each submission can go into a separate file. The directory and file name can be customized (for example to include a timestamp or alphabetical with the first name, etc). Within each file, the submission can be comma separated or multi line, as above.
    - When the data is stored in a file, the data can be in many different formats—that is as plain text, as HTML, with various separators/embellishment of form fields and values etc.
- Database: each form can be defined in a database table (e.g., SQL database table) with the fields being table columns. Each submission can be a row in the table. The columns of the database table can be automatically created from the list of fields in the form. The types of the columns can be determined based on the types of form elements—example "string" type of column for <input type=text> etc. The relevant SQL statements to create the table would be issued when the form is being configured. The SQL statements that would be used to actually insert form submission data into the table could be prepared in template form, with only the values remaining to be inserted into the SQL statement when the form is submitted.
- For each submission the items to be stored can be chosen. These are:
    - Some or all of the fields in the form, including hidden fields
    - Some or all the derived quantities, licenses, cookies, timestamps, etc
    - Some or all the extra associated information per form that come in the CGI environment variables (e.g., remote machine, browser information, etc.)
- Multiple logs can be specified for each form, with separate configuration settings for all of the above. For example, a mortgage broker has a signup sheet where users sign up to receive an email newsletter. The user information can be captured in a full database (e.g., SQL database, etc.). The user's email address is sent to a separate simple flat file containing email addresses. This file can then be used simply as an email mailing list file.

Database Functionality

The set of actions that take place in the forms handler when each form is submitted is referred to as the "submit time" functionality. The set of functions that is available to a customer with the database of submissions is referred to as the "database functionality". In one embodiment, the database functionality may include:

- Form logs management: this includes rotation, emailing, export, etc.
- Cumulative analysis: the user submissions in a form log can be analyzed interactively on demand. Pre-packaged analyses can be set up to run on a regular basis.
- Per submission access and update: individual submissions can be viewed or updated. Furthermore, certain pre-defined fields can be associated with each submission, where the fields are not in the form initially. These fields can be updated as desired.

Form Logs Management

In one embodiment, the log files or database tables that are used to cumulate form submissions may need to be managed by the customer.

- The logs can be configured to be rotated with a certain regimen. This could be based on a size limitation, a time/day/date driven regimen, etc. The rotation can also be done on demand.
- When a form is edited to add or remove fields, then there may exist an issue of how to deal with the previously gathered data. One option is to create a separate, distinct storage location (e.g., file, directory or database table such as SQL table) for the changed form. Another alternative is to continue to use the same destinations for the changed forms. The customer may need to resolve the ambiguities or differences in table widths, etc.
- The logs can be emailed to a specified address on a regular basis.
- The logs can be exported to other database or contact manager formats on demand. In one embodiment, supported formats could be Microsoft Access mdb files, Goldmine contact manager format, ACT format, etc.
- Another option is to have the forms database exposed to the customer through a "live" ODBC interface. Issues relating to security/password may have to be carefully dealt with because there will be many different customers hosting forms on the system.

Cumulative Analysis

User submissions provide a tremendous wealth of data which companies rarely end up exploiting effectively. The forms are just accumulated with no attempt at looking for big picture patterns. This is usually because the additional step of importing the form submissions into a database or other system capable of performing analysis is too cumbersome. Also, generating reports on a regular basis is difficult to set up. The present invention allows the customer to perform log analysis on demand and on a regular basis.

The following aspects of this functionality can be provided:

- A set of pre-canned queries, applicable across all forms is provided which may include:
    - Number of submissions per unit time. This can be a simple count of submissions per day/month, etc. For example, this may be useful as gross measure of the leads generated in a sales contact form.
    - Counts of radio's, checkboxes, selects. Items that have a fixed range of values can be counted. For example, if a select box asks "which financial management product are you interested in", then the number of submissions of each option (e.g., "product A" or "product B") can be tabulated.

Combination queries can be provided between various fixed input range fields. For example, if the user's income level is chosen in a select box and the automobile of interest is also a select (or radio), then a query can be set up that asks "What percent of users earning >$100,000 expressed an interest in automobile A"?

User IP address/hostname: the IP address of the user submitting the form can be resolved into hostnames. The number of submissions from various hosts or top level domains can be tabulated.

The user can set up arbitrary queries between any form fields. In one embodiment, this feature can be provided via a user interface that allows the user to compose the query and also shows the resulting database query (e.g. SQL) statement for sophisticated users that would like to edit the statement.

The analysis can be performed on demand, interactively at any time

The set of queries can be stored, recalled, edited, deleted, etc.

Any query or group of queries can be set up to be run at a regular interval, e.g., every night or every month. The query results can be sent to an email address.

Per Submission Management

In one embodiment, a complete interface for a customer to track and manage each user submission can be provided. Some of the features of this functionality are listed below:

The customer can list his full set of forms, then ask for a list of submissions of a particular form. In one embodiment, mechanisms to scroll through the list through multiple pages if the number of submissions is large can be provided (e.g., similar to message boards).

The customer can ask to see detail on a particular form. In one embodiment, this leads to a page where the full table row associated with the form is displayed.

At configuration time the customer may set up certain extra fields associated with each form. These fields amount to extra columns in the database table. In one embodiment, these fields do not receive values from user with the submitted form. The idea is for the customer to enter these values at a later time. The usefulness of this feature is illustrated in the examples below.

The customer can change the value of the extra fields. The extra fields might be textual fields, checkboxes, radios, selects, etc., essentially all the usual input types of a form.

The customer can also change the values of the fields that came in with the form. This allows editing of certain errors, etc.

The customer can delete a particular submission entirely. This will involve writes to the database, but on a much lower performance path than the writes done at submit time.

As an example, consider a tech support form which has the usual customer information and problem definition fields. The customer might choose to define 3 additional "extra fields". These could be 'notes' for textual entry of notes by the person handling the case: 'case status'—a select with 3 possibilities open, closed, escalated; and 'person handling the case'—again a select with 2 possibilities Joe and Mary. Thus, Joe can come in to the list of submissions, select a particular one, make a change to the 'person handling the case' to indicate that he is the one who handles the case, call the customer and make some notes in the 'notes' field, and ultimately change the case status to 'closed'. Joe's supervisor can then come in and make a query on how many cases Joe closed last week.

Email

Email is a powerful additional service provided by the system according to the teachings of the present invention to enable a component of a business process.

The email capability has the following aspects:
When the email is sent
What the target addresses are
What the email content is In one embodiment, the customization of the functionality can be done through a browser interface. These various aspects of the email capability are described in more detail below.

When Email is Sent

A customer may choose to send email on demand by manual action. The actual delivery of the email may be specified to be
Now
Delayed to a later time The customer may set up an automatic email delivery based on events. When a first submission is received, a subsequent event or action can be set up for this submission. These events may include the following:

An email can be generated to the user who submitted the form. For example, this could be a "reminder" email—telling a new subscriber to a service to check out the wonderful new stuff available at a web site An email can be generated to the customer. For example, this can serve as a reminder to a sales person to ensure that a follow up happens to a sales lead within 5 days of form submission A new web page form can be generated as a "follow up" form. For example, customers who are prospects can be emailed a URL to come back to. This form would make use of cookies to recognize a returning user, and correlate the user submission of this new form with the previous submission.

The events/actions can be scheduled:
At a particular time of the month
A certain number of days after the first submission
Switched on/off by other automatic or manual events that occur in the mean time Target Addresses The target address can be the complete set of email addresses captured in a table of user submissions.

The target address can be a subset of the email addresses in a table. The subsets can be:
Only those submissions within a certain date range (newer than x, older than x, between x and y, etc.)
Only those submissions with some other property set in the table, for example, only those who requested widget blue and not to those who requested widget red.

The target could be a single address taken from the current form.

Email Content

The content may be a fixed, pre-determined message.
The message may be uploaded by the customer.
The message may be entered in a text box by the customer.
The message may be "mail merged" to be customized to each addressee.

FIG. 6 shows a flow diagram of one embodiment of a method according to the teachings of the present invention. The method starts at block 601 and proceeds to block 610. At block 610, a form is obtained from an author. At block 620, a parsing function is performed to extract attribute information with respect to various form elements contained in the form. At block 630, the author is allowed to configure a set of actions that are to be performed in processing submissions of the form. As described above, the set of actions to be performed in processing submissions of the form include form field validation or validation of user input, form response, form emailing, form logging, form threading, derived quantity generation, license generation, cookies generation and tracking, etc. At block 640, a configuration data structure or control file is generated to store the configuration information provided by the author. As described above, the configuration information provided by the author is used to configure the functionality of a specific program that is designated as the program to process the submissions of the form. In another embodiment, the configuration information provided by the author is used to configure a set of directives to be used by a general form processing program in processing submissions of a plurality of forms.

The invention has been described in conjunction with the preferred embodiment. It is evident that numerous alternatives, modifications, variations and uses will be apparent to those skilled in the art in light of the foregoing description. Although the invention has been described with reference to specific exemplary embodiments, it will be evident that various modifications and changes may be made to these embodiments without departing from the broader spirit and scope of the invention. Accordingly, the specification and drawings are to be regarded in an illustrative sense rather than a restrictive sense.

What is claimed is:

1. A computer-implemented method comprising:
   receiving, through a network, a form authored by a form authoring tool and containing one or more input fields;
   parsing, independently of the form authoring tool, the received form to identify the input fields contained in the received form;
   providing, independently of the form authoring tool, a graphical user interface to enable selection and configuration of one or more actions to be carried out in response to a subsequent specific submission of the form to a server by a third party, wherein the graphical user interface includes the identified input fields, wherein the selection of the one or more actions is from a group of two or more types of actions, and wherein the configuration of the one or more actions allows for the customization of the behavior of the selected one or more actions and allows for the behavior of the configured actions to be dependent upon the identified input fields or the data input during the specific submission of the form to the server;
   automatically generating, independently of the form authoring tool, program code to carry out the one or more selected and configured actions, wherein the program code is external to the form and independent of the form authoring tool;
   receiving the specific submission of the form from the third party at the server;
   automatically determining whether the generated program code is consistent with the specific submission of the form; and
   executing the program code on the server in response to receipt of the specific submission of the form from the third party to carry out the one or more selected and configured actions.

2. The method of claim 1, wherein the form is written in Hyper Text Markup Language (HTML).

3. The method of claim 1, wherein the generated program code is a Common Gateway Interface (CGI) program.

4. The method of claim 1, further comprising modifying the form such that the specific submission is directed to the generated program code.

5. The method of claim 1, further comprising: generating an alert if the generated program code is not consistent with the specific submission of the form.

6. The method of claim 1 wherein the actions to be performed by the program code include validating that submission data is consistent with constraints for the form input fields as configured in the graphical user interface.

7. The method of claim 1 wherein the actions to be performed by the program code include generating one or more quantities computed from data in the specific submission.

8. The method of claim 1 wherein the actions to be performed by the program code include generating one or more licenses in response to the specific submission of the form.

9. The method of claim 1 wherein the actions to be performed by the program code include generating one or more cookies for each user who submits a specific submission of the form.

10. The method of claim 1 wherein the actions to be performed by the program code include emailing one or more elements of data from the specific submission of the form to one or more configured email addresses.

11. The method of claim 1 wherein the actions to be performed by the program code include sending an email message to a to an email address that is contained in the specific submission, and including in the email message one or more strings of fixed text, and one or more strings that is dependent on the submission data.

12. The method of claim 1 wherein the actions to be performed by the program code include generating one or more response pages to the third party upon receipt of the specific submission of the form, wherein the selection of the response page depends on the value of submission data provided by the third party in one or more of the form's input fields and wherein the response page contains one or more strings of fixed text and one more strings that is dependent on the submission data.

13. The method of claim 1 wherein the actions to be performed by the program code include preserving a state of data submitted in one or more fields in the specific submission of the form, passing the state of the data to a second form, wherein the second form has one or more fields in common with the first form, and presenting the second form to the third party in response to the submission of the first form.

14. The method of claim 1 wherein the actions to be performed by the program code include logging values for one or more data values submitted in the specific submission of the form.

15. The method of claim 14 wherein the values are stored in a database.

16. The method of claim 15 wherein the values in each submission are stored in a single row of a table, different submissions corresponding to different rows of the table.

17. A server comprising:
   a communications device connected to a network to receive a form from a client coupled to the network, the form authored by a form authoring tool and containing one or more input fields;
   a memory coupled to the communications device to store the received form; and a processor coupled to the memory, wherein the memory stores instructions that, when executed by the processor, provide, independently of the form authoring tool, the functionality of a parser to parse the received form to identify the input fields contained in the received form;

a graphical user interface generator to create a graphical user interface including the input fields identified by the parser, and to provide the graphical user interface using the communications device to enable the selection and configuration of one or more actions from a group of two or more types of actions, the one or more actions to be carried out upon subsequent submission of a specific instance of the form to the server by a third party, wherein the specific submission of the form to the server from the third party includes data added by the third party into the input fields, wherein the configuration of the one or more actions allows for the customization of the behavior of the selected one or more actions, and wherein the configured actions are dependent upon the identified input fields or the data input during the specific submission of the form to the server;

a code generator to automatically generate program code to carry out the one or more selected and configured actions, wherein the program code is external to the form;

a consistency module to automatically determine whether the generated program code is consistent with the specific submission of the form; and a controller to execute the program code on received data from the specific submission of the form.

18. The server of claim 17, wherein the parser, the graphical user interface generator, and the code generator are all implemented using the processor.

19. The server of claim 17, wherein the form is written in Hyper Text Markup Language (HTML).

20. The server of claim 17, wherein the generated program code is a Common Gateway Interface (CGI) program.

21. The server of claim 17, wherein the consistency module generates an alert if the program code is not consistent with the specific submission of the form.

22. A non-transitory machine-readable storage medium containing data representing instructions that, when executed by a processor, cause the processor to perform operations comprising:

receiving, through a network, a form authored by a form authoring tool and containing one or more input fields;

parsing, independently of the form authoring tool, the received form to identify the input fields contained in the received form;

providing, independently of the form authoring tool, a graphical user interface to enable selection and configuration of one or more actions to be carried out in response to a subsequent specific submission of the form to a server by a third party, wherein the graphical user interface includes the identified input fields, wherein the selection of the one or more actions is from a group of two or more types of actions, wherein the configuration of the one or more actions allows for the customization of the behavior of the selected one or more actions and allows for the behavior of the configured actions to be dependent upon the identified input fields or the data input during the specific submission of the form to the server;

automatically generating, independently of the form authoring tool, program code to carry out the one or more selected and configured actions, wherein the program code is external to the form and independent of the form authoring tool;

receiving the specific submission of the form at the server from the third party;

automatically determining whether the generated program code is consistent with the specific submission of the form; and executing the program code on the server in response to receipt of the specific submission of the form from the third party to carry out the one or more selected and configured actions.

23. The machine-readable medium of claim 22, wherein the form is written in Hyper Text Markup Language (HTML).

24. The machine-readable medium of claim 22, wherein the generated program code is a Common Gateway Interface (CGI) program.

25. The machine-readable medium of claim 22, wherein the instructions further cause the processor to perform operations comprising associating the generated program code with the form.

26. The machine-readable medium of claim 22, wherein the instructions further cause the processor to perform operations comprising generating an alert if the generated program code is not consistent with the specific submission of the form.

27. A computer-implemented method comprising:

receiving, through a network, a form authored by a form authoring tool and containing one or more input fields;

parsing, independently of the form authoring tool, the received form to identify the input fields contained in the received form;

providing, independently of the form authoring tool, a graphical user interface to enable selection and configuration of one or more actions to be carried out in response to a subsequent specific submission of the form to a server by a third party, wherein the graphical user interface includes the identified input fields, wherein the selection of the one or more actions is from a group of two or more types of actions, wherein the configuration of the one or more actions allows for the customization of the behavior of the selected one or more actions and allows for the behavior of the configured actions to be dependent upon the identified input fields or the data input during the specific submission of the form to the server;

automatically generating, independently of the form authoring tool, program code to carry out the one or more selected and configured actions, wherein the program code is external to the form and independent of the form authoring tool;

receiving the specific submission of the form from the third party at the server; and automatically determining whether the generated program code is consistent with the specific submission of the form.

* * * * *